March 12, 1935. R. HIGGINS 1,994,279
PHASE ANGLE CORRECTION NETWORK
Filed Aug. 15, 1934
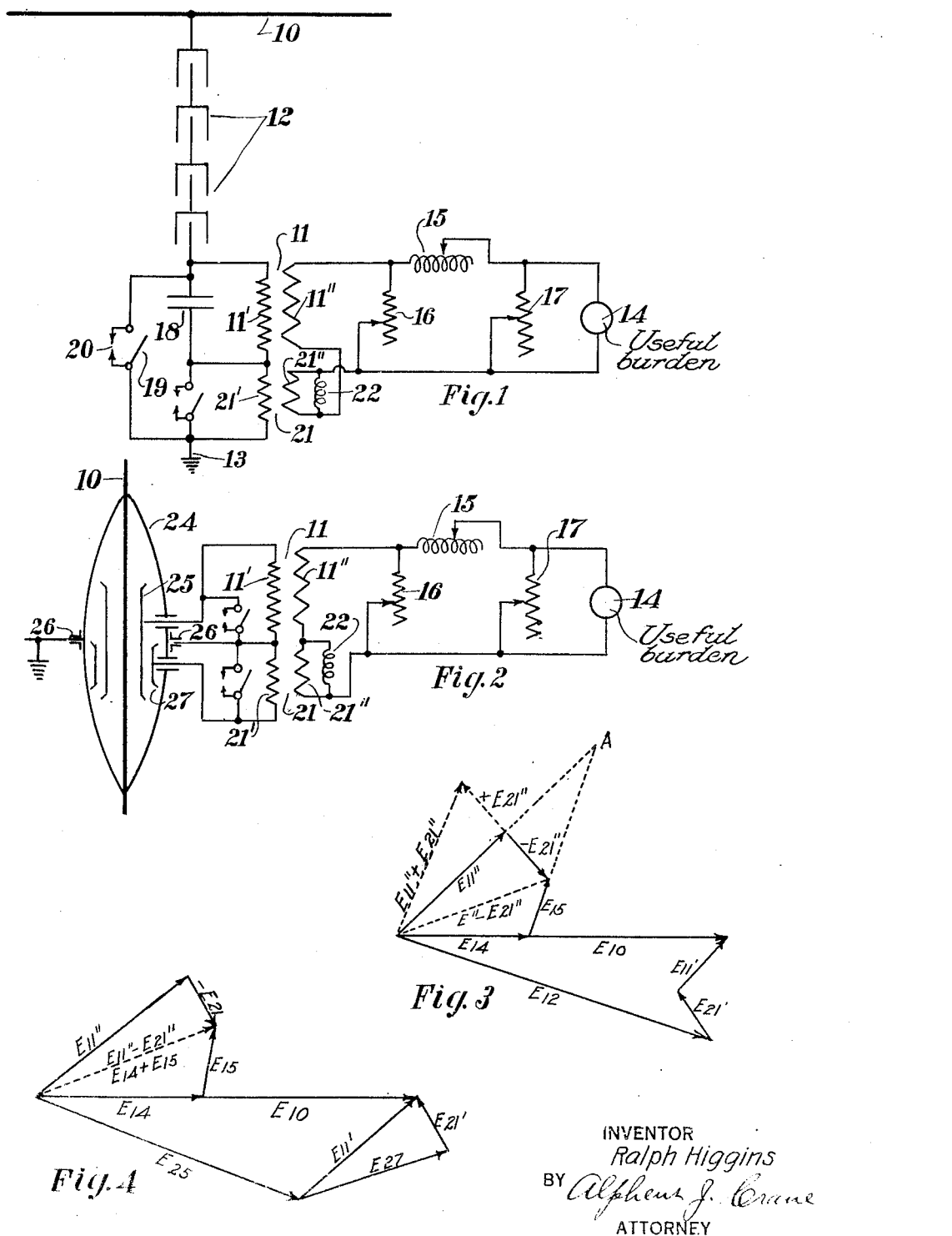
INVENTOR
Ralph Higgins
BY Alpheus J. Crane
ATTORNEY Patented Mar. 12, 1935

1,994,279

UNITED STATES PATENT OFFICE 1,994,279

PHASE ANGLE CORRECTION NETWORK

Ralph Higgins, Akron, Ohio, assignor to The Ohio Brass Company, Mansfield, Ohio, a corporation of New Jersey Application August 15, 1934, Serial No. 739,949

10 Claims. (Cl. 172—246)

This invention relates to a network of electrical apparatus and connections for making phase angle adjustments, and is particularly applicable to phase angle correction for apparatus connected to a source of alternating current voltage through a capacitance coupling. In my prior Patent No. 1,950,676, March 13, 1934, I have shown a network for making phase angle corrections in which adjustable resistors are used for making close adjustments. The network there shown is suitable for most apparatus connected to high voltage lines through capacitance couplings, either in the form of bushing insulators or special condensers connected to the line. In some cases, however, where the burden is highly inductive, if it is desirable to bring the voltage on the burden into phase with the voltage on the line, the available power for the burden is reduced more than desirable by the arrangement shown in my prior patent.

One object of the present invention is to overcome this difficulty and permit adjustment of the voltage on the load into phase with the voltage on the line without seriously reducing the power available for the burden.

Other objects and advantages will appear from the following description.

The invention is exemplified by the combination and arrangement of parts and connections shown in the accompanying drawing and described in the following specification, and it is more particularly pointed out in the appended claims.

This application is in part a substitute for my prior application Serial Number 712,150, filed February 20, 1934.

In the drawing:

Fig. 1 is a wiring diagram showing one arrangement of the present invention.

Fig. 2 is a wiring diagram showing a slightly different arrangement.

Fig. 3 is a vector diagram illustrating the magnitude and phase angle relation of the voltage on the various apparatus shown in Fig. 1.

Fig. 4 is a vector diagram illustrating the magnitude and phase angle relation of the voltage on the various parts shown in Fig. 2.

In Fig. 1 the numeral 10 designates a high voltage transmission line to which a transformer 11 has its primary 11' connected by means of condensers 12, one end of the transformer primary being connected to ground at 13. The burden 14 is connected to the secondary 11" of the transformer 11. An inductance 15 is inserted in series with the burden 14 and two adjustable resistances 16 and 17 are connected across the secondary, one at each side of the impedance 15. By means of the inductance 15 and the two resistances 16 and 17, it is possible to adjust the phase angle of the voltage on the burden 14 in relation to the voltage on the line, as explained in my prior patent referred to above. There will be capacitance 18 in parallel with the primary of the transformer 11 which may be either the capacitance between the lower terminal of the condenser 12 and ground or may be a separate condenser. A short-circuiting switch 19 is provided for cutting out the transformer 11 for purposes of inspection and adjustment, and an arcing gap 20 is provided for limiting the voltage on the transformer. The apparatus thus far described is all explained and claimed in my prior patent referred to above.

The present improvement consists in the addition of a supplemental transformer 21 having its primary 21' connected between the primary of the transformer 11 and ground and having its secondary 21" connected in series with the secondary circuit of the transformer 11, as regards its relation to the burden 14, 15, 16 and 17, but in reverse position so that the voltage induced in the secondary of the supplemental transformer will be opposed to the voltage of the secondary of the main transformer although it will not be in phase with the voltage of the main secondary but will be leading relative to the voltage in the main secondary. In order to insure a large angle of lead, an inductance coil 22 is connected in parallel with the secondary of the supplemental transformer 21. Another way of regarding the circuit is to consider the two secondaries 11" and 21" connected in parallel to the inductance 22 with the burden comprising the impedances 14, 15, 16 and 17 interposed in series in the circuit of the main secondary 11".

Tests and operation show that the arrangement described above permits adjustment of the phase angle of the voltage on the burden 14 into phase with the voltage on the line 10 without material reduction in the available energy, even when the burden 14 is highly inductive. It is thought that the reasons for this will be apparent from an examination of the voltage relations, as shown in the vector diagram in Fig. 3. As will be seen from Fig. 3 the line voltage $E_{10}$ is divided into three portions or components comprising $E_{12}$, the voltage on the condensers 12, $E_{11}'$ the voltage on the primary of the transformer 11, and $E_{21}'$ the voltage on the primary of the transformer 21. The voltage induced in the secondary of the transformer 11 is distributed to the various portions of the secondary burden, as shown in the upper portion of Fig. 3. The voltage $E_{21}''$ induced in the secondary of the transformer 21 is highly leading, as shown by the broken line at the upper portion of the figure. If this were added to $E_{11}''$ it would throw the resultant voltage of the secondary to an extremely leading position, shown in the broken line in Fig. 3, marked $E_{11}''+E_{21}''$. This would give such a great lead to the secondary voltage that it would be practically impossible to adjust the voltage on the burden 14 into phase with the voltage on the line. By reversing the secondary connection of the transformer 21, however, the voltage is subtracted from that of the main transformer 11 and takes the position shown in full lines in the diagram, Fig. 3, and designated by the reference character $-E_{21}''$. This gives an effective voltage much less leading than the voltage of the secondary of the main transformer 11, as shown by the broken line $E_{11}''-E_{21}''$. The relatively small angle of lead of this effective secondary voltage may now be easily compensated for by the impedance 15, the voltage drop of which is indicated at $E_{15}$. The diagram shows that the effective voltage $E_{11}''-E_{21}''$ is divided into two components $E_{14}$ impressed on the burden 14 and in phase with the line voltage and $E_{15}$ which is impressed on the impedance 15 and is largely leading relative to the line voltage. In order to produce the voltage $E_{14}$ of the magnitude indicated and in phase with the voltage $E_{10}$, if it were not for the supplemental voltage $E_{21}''$, it would be necessary to continue the line $E_{11}''$, Fig. 3, to the point A to meet the voltage $E_{15}$. It is apparent that this would require a much higher voltage on the transformer in order to secure the same effective voltage on the burden, or, in other words, for a given voltage induced on the secondary of the transformer, a much higher voltage is obtained on the burden, in phase with the line voltage, by using the supplemental transformer connected in reverse relation to the main transformer; the supplemental transformer having a voltage highly leading with respect to the line voltage.

As explained in my prior patent cited above, the principal voltage adjustment is produced by the inductance 15, and the resistances 16 and 17 are used for securing close adjustments. It will be understood that if the proper values of the various factors were employed, the voltage relation shown in Fig. 3 would exist without the resistances 16 and 17. However, these resistances are important in a circuit for fine adjustments and for other reasons more fully explained in my prior patent.

In the connection shown in Fig. 2, the transformer 11 is connected to the line 10 by means of a bushing 24 having a capacitance coupling member 25. One end of the primary 11' is connected to the coupling member 25 and the other end of the primary 11' is connected to the bushing flange 26 which is grounded. The transformer 21 has its primary 21' connected to a supplemental capacitance coupling or condenser plate 27 which is of smaller size than the plate 25 and is disposed outside of the plate 25 between the plate and ground, being insulated of course from the plate 25. The secondaries 11'' and 21'' are directly connected in series in this case since the primaries are reversed. In other respects, the circuit shown in Fig. 2 is like that in Fig. 1 and the effect of the supplemental transformer 21 is the same as in Fig. 1.

The phase relation of the voltages on the various elements of the circuit is shown in Fig. 4, the vectors being lettered to identify them with the elements of the circuit to which they correspond. It will be seen that the voltage $E_{14}$ on the load can be brought into phase with the line voltage $E_{10}$.

The invention is primarily intended for voltage indication, relay operation, and other functions requiring a definite phase angle relation between the voltage of the line and the voltage impressed on the burden 14 and also requiring that current shall be supplied to the burden 14 proportional to the voltage on the transmission line. Since a capacitance coupling is used for making the connection with the line and since the charging current for this coupling will be proportional to the voltage on the line, means is thus provided for securing a current of the correct proportion. It is also essential, of course, in order to maintain this proportionality for the current in the burden 14, that the transformer cores shall be operated at as low a point on the saturation curve as possible. Transformers are, therefore, used in which the cores will be operated far below the saturation point throughout the entire range of operation. This is true of the cores of both transformers and also of the impedances used in the circuit. Both the main and supplemental transformers are designed to have a flux density well below the saturation point for all voltages up to and including the maximum voltage normally impressed on conductor 10 so as to induce currents in the secondaries proportional to the currents in the primaries and consequently proportional to the voltage on the line 10.

I claim:

1. The combination with a source of high potential voltage, of a transformer having its primary connected to said source through a capacitance coupling and supplied through said connection with current substantially proportional to the voltage of said source, an electrical translating device connected to the secondary of said transformer, said transformer and core being designed to produce a flux density in said core well below the saturation point throughout the normal range of voltage of said source to induce a secondary current substantially proportional to the primary current, and means for controlling the phase angle of the voltage impressed on said translating device relative to the voltage on said source, said means comprising a supplemental transformer having its primary energized from said source and having its secondary connected to the secondary circuit of said first-named transformer and impressing a voltage on said circuit affecting the phase angle relation of the voltage on said translating device to the voltage on said source.

2. The combination with a high potential transmission line, of a capacitance coupling connected to said line, a transformer having its primary connected to said line by said capacitance coupling, an electrical translating device connected to the secondary of said transformer, and a supplemental transformer having its primary connected to said line and having its secondary connected in series with the secondary of said first-named transformer but in reverse relation thereto, said transformers being designed to produce a low flux tensity well below saturation in their respective cores for all normal voltages of said line to induce currents in their secondaries substantially proportional to the currents in their respective primaries.

3. The combination with a high potential transmission line, of two transformers having their primaries in series with each other, capacitance means connecting the primaries of said transformers to said transmission line, the secondary windings of said transformers being connected in series with each other and with a translating device, one of the windings of one of the transformers being reversed with relation to the winding of the other transformer with which it is connected, the cores of said transformers being designed to operate at flux densities well below saturation throughout the normal voltage range of said line.

4. The combination with a high potential transmission line, of a capacitance coupling connected with said line, a main transformer having its primary winding connected to said line by said capacitance coupling, an electrical translating device connected to the secondary of the main transformer, the core of said main transformer being designed to operate at a flux density well below saturation for all normal working voltages on said line, a supplemental transformer also having its primary connected to said transmission line by said coupling, the secondary of said supplemental transformer being connected in series with the translating device and the secondary winding of said main transformer but so that the voltages of said secondary windings are subtracted, the voltage of said supplemental transformer being leading by a large angle relative to the voltage of said transmission line.

5. The combination with a high potential transmission line, of a condenser having one terminal thereof connected with said line, a main transformer having its primary winding connected to said line by said condenser, a supplemental transformer having its primary connected to said line by said condensers in series with the primary of said main transformer, the secondaries of said transformers being connected in series, an electrical translating device in series with said secondaries, one of the windings of one of said transformers being reversed relative to the winding of the other transformer with which it is connected, and an inductance in parallel with one of the windings of said supplemental transformer.

6. The combination with a high potential transmission line, of a condenser having one terminal thereof connected with said line, a main transformer having its primary connected to said line by said condenser, a supplemental transformer having its primary connected to said line by said condenser in series with the primary of said main transformer, the secondaries of said transformers being connected in series, one of the windings of one of said transformers being connected in reverse relation to the winding of the other transformer, an electrical translating device connected to the secondaries of said transformers to be energized thereby, an inductance in series with said secondaries and said translating device, and a supplemental inductance in parallel with one of the windings of said supplemental transformer.

7. The combination with a high potential transmission line, of means for diverting energy from said line comprising a capacitance coupling, a main transformer having its primary winding connected to said transmission line by said coupling, a translating device connected with the secondary of said winding to be energized thereby, and means for adjusting the phase angle of the voltage impressed on said translating device relative to the voltage on said line, said means comprising an inductance in series with said translating device, an adjustable resistance for regulating the effect of said inductance on the phase angle of the voltage on said translating device, and a supplemental transformer having its primary winding connected to said transmission line by said capacitance coupling and having its secondary winding connected in series with the secondary winding of said main transformer but having the voltage thereof opposed to the voltage of the secondary winding of said main transformer, and an inductance in parallel with the secondary winding of said supplemental transformer.

8. The combination with a high potential transmission line, of a capacitance coupling connected with said line, a transformer having its primary winding connected to said line by said capacitance coupling and supplied thereby with a current substantially proportional to the voltage of said line, a translating device connected to the secondary of said transformer, said transformer being designed to operate at low flux density of its core through the normal voltage range of said line to give a secondary current substantially proportional to the voltage of said line, and means for impressing a supplemental voltage, out of phase with the voltage of the secondary of said transformer, on the circuit comprising said translating device and the secondary of said transformer for correcting the phase angle of the voltage on said translating device relative to the phase angle of the voltage on said transmission line.

9. The combination with a high potential transmission line, of a capacitance coupling connected with said line, a main transformer having its primary connected to said line by said capacitance coupling, said transformer having its core designed to operate at a flux density well below saturation for all normal working voltages on said line to induce current in the secondary of said transformer substantially proportional to the current in the transformer primary, a translating device connected to the secondary of said main transformer and supplemental means for impressing a voltage on the circuit comprising said translating device, said supplemental means comprising a supplemental transformer having its primary energized from said transmission line and having its secondary connected to the secondary circuit of said main transformer, the voltage so impressed by said supplemental transformer being out of phase with the voltage impressed on said circuit by the secondary of said main transformer.

10. The combination with a conductor, of a bushing insulator through which said conductor extends, a capacitance member associated with said insulator and forming a capacitance coupling with said condenser, a transformer having its primary winding connected with said capacitance member and energized thereby, an electrical translating device connected with the secondary of said transformer, a supplemental capacitance member associated with said insulator, a supplemental transformer having its primary winding connected with said supplemental capacitance member, the secondary winding of said transformer being connected to the secondary winding of said first-named transformer for phase angle correction.

RALPH HIGGINS.